United States Patent
Ing

(10) Patent No.: US 7,583,255 B2
(45) Date of Patent: Sep. 1, 2009

(54) MAN-MACHINE INTERFACE METHOD AND DEVICE

(75) Inventor: Ros Kiri Ing, Paris (FR)

(73) Assignee: Sensitive Object, Paris (FR)

( * ) Notice: Subject to any disclaimer, the term of this patent is extended or adjusted under 35 U.S.C. 154(b) by 580 days.

(21) Appl. No.: 10/581,423

(22) PCT Filed: Nov. 26, 2004

(86) PCT No.: PCT/FR2004/003047

§ 371 (c)(1),
(2), (4) Date: Jun. 2, 2006

(87) PCT Pub. No.: WO2005/057393

PCT Pub. Date: Jun. 23, 2005

(65) Prior Publication Data

US 2007/0085821 A1    Apr. 19, 2007

(30) Foreign Application Priority Data

Dec. 2, 2003   (FR) .................................. 03 14165

(51) Int. Cl.
*G06F 3/02* (2006.01)
*H03K 17/94* (2006.01)
*H03M 11/00* (2006.01)
(52) U.S. Cl. .......................... 345/168; 345/156; 341/22
(58) Field of Classification Search ......... 345/156–184; 455/411; 341/20–35
See application file for complete search history.

(56) References Cited

U.S. PATENT DOCUMENTS

| | | | |
|---|---|---|---|
| 4,688,020 A * | 8/1987 | Kuehneman et al. .......... 341/22 |
| 5,790,104 A | 8/1998 | Shieh | |
| 5,920,308 A * | 7/1999 | Kim ............................. 345/168 |
| 6,903,728 B1 * | 6/2005 | Baker et al. .................. 345/169 |
| 7,151,528 B2 * | 12/2006 | Taylor et al. ................. 345/168 |
| 7,231,231 B2 * | 6/2007 | Kokko et al. ................. 345/173 |
| 2003/0066692 A1 | 4/2003 | Devige et al. | |
| 2004/0203604 A1 * | 10/2004 | Pugliese ....................... 455/411 |
| 2005/0024344 A1 | 2/2005 | Trachte | |

FOREIGN PATENT DOCUMENTS

| | | |
|---|---|---|
| EP | 0 546 704 A2 | 6/1993 |
| FR | 2 811 107 | 1/2002 |
| WO | WO 03/054680 A2 | 7/2003 |

OTHER PUBLICATIONS

IBM Technical Bulletin, "Soft Adaptative Follow-Finger Keyboard for Touch-Screen Pads", 36:5-7, 1993.

* cited by examiner

*Primary Examiner*—David L Lewis
(74) *Attorney, Agent, or Firm*—Occhiuti Rohlicek & Tsao LLP

(57) ABSTRACT

A man-machine interface method comprising generating physical interactions with active zones (10) belonging to an interface object (5), the active zones being associated with predetermined items of information, detecting the active zones where interactions occur by measuring at least one physical magnitude, and associating each detected interaction with the corresponding predetermined item of information. The active zones are defined for a predetermined finite length of time and they are then deactivated at the end of said predetermined length of time, and when interactions with the interface object are detected while the active zones are deactivated, the active zones are automatically redefined as a function of the first detected interactions.

20 Claims, 1 Drawing Sheet

MAN-MACHINE INTERFACE METHOD AND DEVICE

CROSS-REFERENCE TO RELATED APPLICATIONS

This application is the National Stage of International Application No. PCT/FR2004/003047, filed Nov. 26, 2004, which claims the benefit of French Patent Application Serial No. 0314165, filed on Dec. 2, 2003. The contents of both applications are hereby incorporated by reference in their entirety.

The present invention relates to man-machine interface methods and devices.

BACKGROUND OF THE INVENTION

More particularly, the invention relates to a man-machine interface method comprising: generating physical interactions with active zones belonging to an interface object, said active zones being associated with predetermined items of information; detecting the active zones at which said interactions occur by measuring at least one physical magnitude; and associating each detected interaction with the predetermined item of information corresponding to the active zone where said interaction has been detected.

Document FR-A-2 811 107 describes an example of such a method. Methods of this type nevertheless suffer from the drawback of drifting over time, in particular as a function of the interface object aging and variations in ambient conditions, in particular temperature. In the long run, this leads to the man-machine interface malfunctioning.

SUMMARY OF THE INVENTION

A particular aim of the present invention is to mitigate those drawbacks.

To this end, according to the invention, a method of the kind in question is characterized in that the active zones are defined for a predetermined finite length of time and then deactivated at the end of said predetermined length of time; and in that when interactions with said interface object are detected while said active zones are deactivated, said active zones are redefined automatically as a function of the first detected interactions.

By means of these dispositions, the active zones are regularly redefined, thereby avoiding the above-mentioned problems of drift.

In various implementations of the method of the invention, recourse may optionally also be had to one or more of the following dispositions:

- when interactions are detected with the interface object while said active zones are deactivated, said active zones are automatically redefined only if a predetermined initial sequence of interactions is detected;
- said predetermined initial sequence of interactions comprises two successive interactions at a single location on the interface object, within a time interval shorter than a predetermined duration;
- the location of said two successive interactions determines a first active zone;
- during a stage of redefining active zones subsequent to said initial sequence, a predetermined number K of active zones are defined in succession at the locations of the K first interactions to be detected after said initial predetermined sequence of interactions (thus defining a total number N of active zones that is equal either to K or to K+1 if the initial sequence defines one active zone, or equal to K+p active zones if the initial sequence defines p active zones);
- the stage of redefining the active zones is interrupted if no following interaction is detected during a predetermined timeout after a detected interaction;
- during the stage of redefining active zones, an interaction is detected in an active zone when the measured physical magnitude is subject to a variation that is greater than a first predetermined limit, and after said stage of redefining active zones, an interaction is detected in an active zone when the measured physical magnitude is subject to a variation greater than a second predetermined limit that is itself less than the first limit;
- during the stage of redefining active zones, an interaction is detected in an active zone when the measured physical magnitude is subject to a variation for a duration that is longer than a first predetermined limit duration, and after said stage of redefining active zones, an interaction is detected in an active zone when the measured physical magnitude is subject to a variation for a duration that is longer than a second predetermined limit duration, itself shorter than the first limit duration;
- when interactions with the interface object are detected while the active zones are deactivated, the P first detected interactions are recorded during a recording stage, where P is a predetermined non-zero integer, and Z active zones are automatically redefined as a function of said first P detected interactions, where Z is a non-zero integer less than P, corresponding to interactions detected in different zones, and then the predetermined items of information corresponding to the P first detected interactions are determined;
- the recording stage is interrupted if one of the P first interactions is not followed by a following interaction within a time period shorter than a predetermined timeout duration;
- when interactions with the interface object are detected while the active zones are deactivated, the P first detected interactions are recorded during a recording stage, where P is a non-zero integer, said recording stage terminating when the interaction P is substantially identical to the first interaction of the recording stage, and P−1 active zones are automatically redefined as a function of said P first detected interactions corresponding to interactions detected in different zones, and then the predetermined items of information corresponding to the P−1 redefined active zones are determined, with said items of information depending on the number P−1;
- the set of active zones is subdivided into a plurality of groups of active zones, and when interactions with the interface object are detected in an active zone belonging to a group of deactivated active zones, said active zones of said group of active zones are redefined automatically and successively in a manner that is independent from the other groups of active zones;
- when interactions are detected with the interface object while said active zones are deactivated, said active zones are redefined automatically and successively as a function of the first interactions to be successively detected, and the detected interactions are associated substantially simultaneously with the predetermined items of information; and
- the measured physical magnitude is selected from a soundwave, a mechanical strain, a quantity of back-scattered light, and an electric field.

The invention also provides a man-machine interface device specially adapted to implement a method as defined above.

BRIEF DESCRIPTION OF THE DRAWINGS

Other characteristics and advantages of the invention appear from the following description of an embodiment thereof, given by way of non-limiting example and with reference to the accompanying drawing, in which.

DETAILED DESCRIPTION OF THE PREFERRED EMBODIMENTS

In the various figures, the same references designate elements that are identical or similar.

Figure 1:
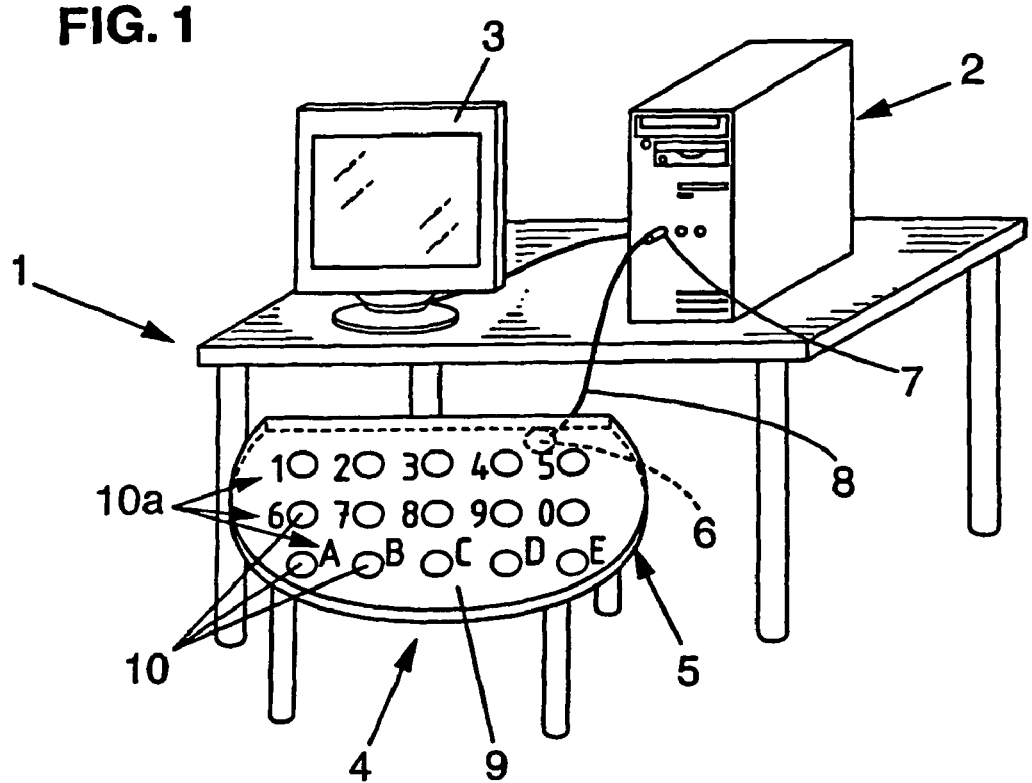
FIG. 1 is a diagrammatic perspective view showing an example of a device including an acoustic interface object adapted to implement a method in accordance with the invention.

FIG. 1 shows a device 1 for implementing the present invention, and comprising for example:

a microcomputer central processor unit (CPU) 2;
a screen 3 connected to the CPU 2; and
a man-machine interface 4 capable of delivering information to the CPU 2, in the example described.

The man-machine interface 4 comprises a solid interface object 5, which is constituted in this example by a table in which soundwaves are caused to propagate by generating impacts on its surface 9, as described in particular in French patent application No. 02/07208.

Nevertheless, it should be observed that the interface object could be constituted by any other heterogeneous or homogenous object constituted as a single piece or as a plurality of parts assembled together or merely mutually in contact, such as: a window, a window pane, a door, a portable tablet, a computer screen, a display panel, an interactive terminal, a toy, a vehicle dashboard, the rear surface of the back of a seat in an airplane or in the front of a motor vehicle, a wall, the floor, a vehicle bumper (with the information transmitted by the acoustic interface then being the position of an impact against the bumper), etc.

At least one sound sensor 6 is secured to the object 5, said sound sensor 6 being connected for example to the microphone input 7 of the CPU 2, by means of a cable 8 or any other transmission means (wireless, infrared, or other), so as to pick up said soundwaves and transmit them to the CPU 2. In the example shown, there is only one sensor 6, however a plurality of sensors could be used without going beyond the ambit of the present invention.

By way of example, the sound sensor 6 may be a piezoelectric sensor or some other kind of sensor (e.g. a capacitive sensor, a magnetostrictive sensor, an electromagnetic sensor, a velocity microphone, an optical sensor [laser interferometer, laser vibration meter, . . . ], etc.). By way of example, it may be adapted to measure physical magnitudes such as the amplitudes of displacements due to soundwaves propagating in the object 5 forming the acoustic interface, or indeed the velocities or the accelerations of such displacements. The sensor 6 could also be a pressure sensor measuring pressure variations due to soundwaves propagating in the object 5.

Over at least a portion of the outside surface 9 of the object 5 (specifically the top face of the table constituting said object 5 in the example shown in FIG. 1), there are defined a number N of active zones 10, where the number N is generally greater than 1 and the active zones need not be physically defined, but could be well defined e.g. by physical marking, or indeed by light marking obtained by projecting an image on the surface 9.

The various active zones 10 may be merely portions of the surface 9 that are identical to the remainder of the surface 9. Nevertheless, these active zones differ from one another and from the remainder of the surface 9 insofar as an interaction with one of the zones 10 (e.g. an impact) generates an acoustic signal different from the signal generated by an impact against another one of the active zones 10 or some other portion of the surface 9.

Each of the active zones 10 is associated with predetermined information that a user might desire to send to the central unit 2. The information in question may be, for example: a command, a digit, a letter, a position on the surface 9, or any other information of the kind that can usually be transmitted to an electronic device such as a microcomputer (or the CPU of some other electronic apparatus) by means of conventional input interfaces such as a keyboard, control buttons, a mouse, etc.

The information in question may be non-explicit, or possibly it may be indicated in the clear by marking 10a on the surface 9 (like the marking defining the zones 10, this marking may be physically applied to the surface 9, or may instead be projected in the form of light images onto said surface 9).

It should be observed that the predetermined information associated with each active zone 10 may either be always the same, or else it may vary as a function of the running of a program in the CPU 2, or it may depend on previous actions on other active zones 10 (for example certain active zones 10 may be actuated to change the function given to one or more active zones 10 activated thereafter, e.g. for the purpose of accessing specific functions, special characters, or indeed for using capital letters, etc.). In any event, the information is predetermined information insofar as it is effectively determined at the latest at the instant when each active zone 10 is activated.

The various active zones 10 of the object 5 thus constitute a genuine virtual keyboard that can be activated by tapping on its active zones, equally well with a fingernail, a fingertip, or an instrument such as a pen, a stylus, etc.

Figure 2:
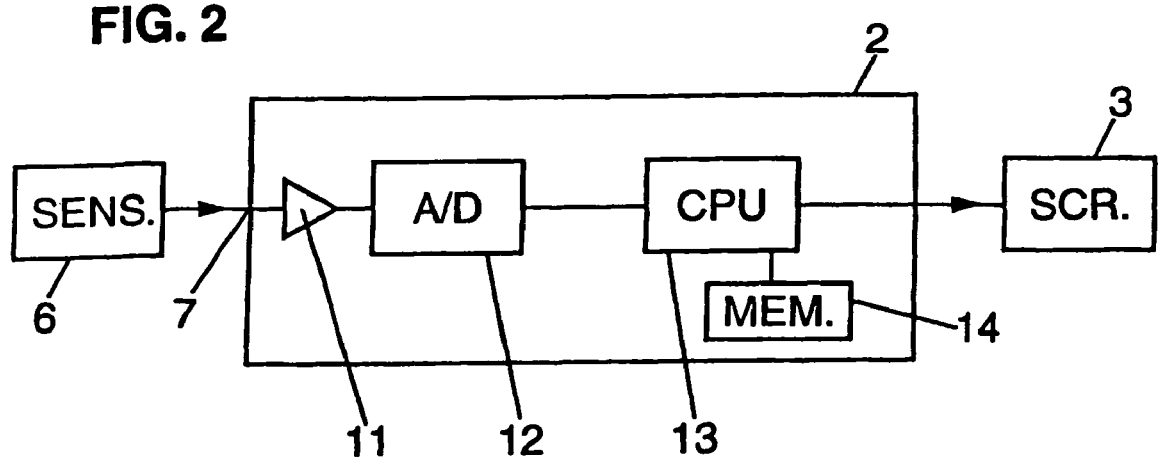
FIG. 2 is a block diagram of the FIG. 1 device.

As shown in FIG. 2, the sensor 6 (SENS.) can be conventionally connected via the input 7 to an amplifier 11, itself connected to an analog-to-digital converter (A/D) 12, which forwards the signals it receives to the processor 13 of the CPU 2, which processor is itself connected to one or more memories (MEM.) 14 and controls the above-mentioned screen 3 (SCR.) or any other output interface for returning information to the user.

It should be observed that the acoustic interface 4 could be used as an interface for inputting information to any electronic device other than a microprocessor, e.g. a professional or household electronic appliance, a door code pad, a vehicle CPU, etc. In any event, the electric signals generated by the sensor(s) 6 can be processed either in the electronic appliance or in an external digital signal processor (DSP) device.

Furthermore, the physical magnitude that is measured need not necessarily be a soundwave, but could also be:

a mechanical strain (using one or more strain gauges for this purpose that are disposed in various locations on the interface object 5);
a quantity of back-scattered light (e.g. if the device includes an infrared or other transmitter emitting an amplitude modulated light beam [e.g. at 40 kilohertz (kHz)] at grazing incidence on the surface 9, and, for example, one or two [or more] optical sensors measuring the back-scattered light when the user interacts with said beam [e.g. by placing a finger on an object on the surface 9]); or an electric field, in particular at high frequency (e.g. about one hundred kHz) emitted by an antenna in the vicinity of the surface 9 and picked up by one or more sensors, said field being modified by the presence of a finger of the user or some other object on the surface 9.

According to the present invention, the active zones 10 are defined for a predetermined finite length of time (e.g. a few minutes or a few hours depending on the intended applications) and then they are deactivated by the microcomputer 2 or other appliance, at the end of said predetermined length of time. When interactions with the interface object 5 are detected while the active zones 10 are deactivated, the microcomputer 2 or other appliance automatically redefines said active zones as a function of the first interactions detected on the surface 9 by the sensor 6, thereby avoiding the problems of the interface drifting over time.

In a first implementation of the method of the invention, when interactions are detected with the interface object 5 while the active zones 10 are deactivated, said active zones are redefined automatically only if a predetermined initial sequence of interactions is detected, e.g. two successive interactions in a single location on the interface object and spaced apart by a time interval that is shorter than a predetermined duration (e.g. a few seconds). The fact that the two interactions take place at the same location means that the same acoustic signal will be picked up twice by the sensor 6.

The location of said two successive interactions may advantageously determine a first active zone 10. In other words, in normal operation, when the microcomputer 2 recognizes the acoustic signal picked up during each of said two successive interactions, it determines that an impact has occurred in the first active zone corresponding to a first item of information (digit letter, or other).

Then, during a stage of redefining the active zones subsequent to said initial sequence, a predetermined number K of active zones are defined in succession as a function of the K first interactions detected after said predetermined sequence of interactions (with K=N−1 in the example described here, or possibly K=N, or indeed K=N−p active zones if the initial sequence defines p active zones). More precisely, during this stage of redefining the active zones, the user generates impacts successively at K different locations on the surface 9 of the interface object, and the microcomputer 2 records the acoustic signals corresponding to each impact. Each of these acoustic signals is unique and specific to the location of the impact that generated it. Thus, in normal operation, when the microcomputer 2 recognizes one of the acoustic signals picked up during the stage of redefining the active zones, it determines that an impact has occurred in the corresponding active zone that corresponds to a predetermined item of information (digit, letter, or other).

The different items of information corresponding to the different active zones depend solely on the order in which the active zones are subjected to impacts during the stage of redefining the active zones. The microcomputer 2 may optionally cause messages to be displayed on the screen 3 in order to guide the user during this stage, particularly when the active zones are marked on the surface 9.

It should be observed that the stage of redefining active zones can be interrupted and cancelled, for example if no further interaction is detected during a predetermined timeout after one of the K−1 first interactions has been detected. The duration of this timeout may be a few seconds, for example.

Advantageously, during the stage of redefining the active zones, an interaction is detected in an active zone when the measured physical magnitude is subjected to a variation greater than a first predetermined limit, and after said stage of redefining the active zones, an interaction is detected in an active zone when the measured physical magnitude is subjected to a variation that is greater than a second predetermined limit, itself less than the first limit. The interface is thus made less sensitive to parasitic variations in the measured physical magnitude during the stage of redefining the active zones, while remaining sensitive in subsequent stages of use. This technique of varying the sensitivity of the interface applies for physical magnitudes of the pulse type, e.g. an acoustic signal.

In contrast, when the measured physical magnitude is of the "static type", i.e. when said magnitude is subjected to variations that are longer lasting, detection sensitivity is varied by varying the minimum duration of variation in the physical magnitude required to generate a detection. Under such circumstances, during the stage of redefining the active zones, an interaction is detected in an active zone when the measured physical magnitude is subjected to a variation for a length of time that is longer than a first predetermined limit duration, and then after said stage of redefining the active zones, an interaction is detected in an active zone when the measured physical magnitude is subjected to variation over a length of time that is longer than a second predetermined limit duration, that is itself shorter than the first limit duration. This technique applies in particular when the measured magnitude is a strain corresponding to pressing against the surface 9 for a relatively long period, to a quantity of light that is back-scattered by a finger or an object in the vicinity of the surface 9, or to an electric field disturbed by the presence of a finger or an object in the immediate vicinity of the surface 9, as explained above.

In a second implementation of the method of the invention, when interactions are detected with the interface object while said active zones are deactivated, the first P interactions to be detected are recorded during a recording stage, where P is a predetermined non-zero integer, then Z active zones are redefined automatically as a function of said P first detected interactions, where Z is a non-zero integer less than or equal to P, corresponding to interactions detected in zones that are different (i.e. corresponding to different acoustic signals), and then the predetermined information corresponding to the first-detected P interactions is itself determined.

More precisely, in the example described herein, the redefinition of the Z active zones may be implemented by causing the microcomputer 2 to record all the acoustic signals picked up by the sensor 6 during the P impacts generated on the surface 9 of the interface object 5 during the recording stage. Since each signal is specific to a single zone of the surface 9, each new acoustic signal that is different from previously-measured acoustic signals is allocated to a new active zone, e.g. the active zone of rank k (where k is an integer in the range 1 to Z). If the same acoustic signal is subsequently detected during the recording stage, then the microcomputer 2 allocates it to the same active zone of rank k. The item of information associated with this active zone k may merely be a number (e.g. k), or it could be a letter or some other character associated with each recorded acoustic signal.

This second implementation of the invention can advantageously be used for example to enter an access code while using an unmarked surface, e.g. a code for opening a door, a code for accessing software, etc.

By way of example, if the access code is 1; 2; 1; 2; 3, then the user should tap:

once in a first arbitrary location of the surface 9;

then once in a second arbitrary location of the surface 9;

then a second time in the first location;

then a second time in the second location; and then once in a third arbitrary location of the surface 9.

It should be observed that the above-mentioned recording stage can be interrupted and cancelled automatically if one of the first P−1 interactions is not followed by a following interaction within a period shorter than a predetermined timeout duration, e.g. a few seconds.

In a third implementation of the method of the invention, when interactions with the interface object are detected while said active zones are deactivated, the first-detected interactions are recorded during a recording stage until a last interaction that is substantially identical to the first. This produces P first interactions, thereby automatically redefining P−1 active zones, corresponding to the interactions detected in the different zones (i.e. corresponding to different acoustic signals). Finally, the predetermined items of information corresponding to the P−1 redefined active zones are determined. These items may, where appropriate, depend on the number (P−1) of active zones.

Thus, if P−1 is equal to 10, for example, then the items of information corresponding to each of the predetermined active zones can be the digits 0 to 9, whereas when P−1 is equal to 5, the active zones may correspond, for example, to four direction keys and one enter key. In any event, a graphic on a screen can optionally enable the user to visualize the kind of functions being used.

Where appropriate, this implementation can enable a single interface to handle several types of keypad having functions that are completely different, depending on the number of interactions that are generated initially.

In another implementation, the method can enable a plurality of groups of active zones to be defined that can be used independently of one another, e.g. by a plurality of users or else by a single user but corresponding to different types of information. For this purpose, it is necessary for the set of active zones to be subdivided into a plurality of groups of active zones (where each group of active zones may correspond, for example, to a predetermined portion of the surface 9). Thus, when interactions with the interface object are detected in an active zone belonging to a group of active zones that is deactivated, then said active zones of said deactivated group of active zones are redefined automatically and in succession in a manner that is independent of the other groups of active zones.

In another implementation, when interactions with the interface object are detected while said active zones are deactivated, said active zones are redefined automatically and successively as a function of the first interactions detected in succession, and the detected interactions are associated substantially simultaneously with the predetermined items of information. Thus, it is possible to activate a device or to associate an item of information without it being necessary to begin by redefining the active zones of the object. For example, if this method is implemented to activate a door or a blind, it is possible for example to reactivate the zone by producing an impact on the object. The impact will cause a blind to close simultaneously. A new impact on said active zone and generated within a determined length of time could cause the closure to stop, or on the contrary could start opening of the blind. After a determined length of time has elapsed, the active zone is deactivated.

The invention claimed is:

1. A man-machine interface method comprising:
generating physical interactions with active zones belonging to an interface object, said active zones being associated with predetermined items of information;
detecting the active zones at which said interactions occur by measuring at least one physical magnitude; and
associating each detected interaction with the predetermined item of information corresponding to the active zone where said interaction has been detected;
the method wherein the active zones are defined for a predetermined finite length of time and then deactivated at the end of said predetermined length of time; and
when interactions with said interface object are detected while said active zones are deactivated, said active zones are redefined automatically and successively as a function of the first successively-detected interactions.

2. A method according to claim 1, wherein an interactions are detected with the interface object while said active zones are deactivated, said active zones are automatically redefined only if a predetermined initial sequence of successive interactions is detected.

3. A method according to claim 2, in which said predetermined initial sequence of interactions comprises two successive interactions at a single location on the interface object, within a time interval shorter than a predetermined duration.

4. A method according to claim 3, in which the location of said two successive interactions determines a first active zone.

5. A method according to claim 2, in which, during a stage of redefining active zones subsequent to said initial sequence, a predetermined number K of active zones are defined in succession at the locations of the K first interactions to be detected after said initial predetermined sequence of interactions.

6. A method according to claim 5, in which the stage of redefining the active zones is interrupted if no following interaction is detected during a predetermined timeout after a detected interaction.

7. A method according to claim 5, in which during the stage of redefining active zones, an interaction is detected in an active zone when the measured physical magnitude is subject to a variation that is greater than a first predetermined limit, and after said stage of redefining active zones, an interaction is detected in an active zone when the measured physical magnitude is subject to a variation greater than a second predetermined limit that is itself less than the first limit.

8. A method according to claim 5, in which during the stage of redefining active zones, an interaction is detected in an active zone when the measured physical magnitude is subject to a variation for a duration that is longer than a first predetermined limit duration, and after said stage of redefining active zones, an interaction is detected in an active zone when the measured physical magnitude is subject to a variation for a duration that is longer than a second predetermined limit duration, itself shorter than the first limit duration.

9. A method according to claim 1, in which when interactions with the interface object are detected while the active zones are deactivated, the P first detected interactions are recorded during a recording stage, where P is a predetermined non-zero integer, and Z active zones are automatically redefined as a function of said first P detected interactions, where Z is a non-zero integer less than P, corresponding to interactions detected in different zones, and then the predetermined items of information corresponding to the P first detected interactions are determined.

10. A method according to claim 9, in which the recording stage is interrupted if one of the P first interactions is not followed by a following interaction within a time period shorter than a predetermined timeout duration.

11. A method according to claim 1, wherein the interactions with the interface object are detected while the active zones are deactivated, the P first detected interactions are recorded during a recording stage, where P is a non-zero integer, said recording stage terminating when the interaction P is substantially identical to the first interaction of the recording stage, and P-I active zones are automatically redefined as a function of said P first detected interactions corresponding to interactions detected in different zones, and then the predetermined items of information corresponding to the P-I redefined active zones are determined, with said items of information depending on the number P−1.

12. A method according to claim 1, in which the set of active zones is subdivided into a plurality of groups of active zones, and when interactions with the interface object are detected in an active zone belonging to a group of deactivated active zones, said active zones of said group of active zones are redefined automatically and successively in a manner that is independent from the other groups of active zones.

13. A method according to claim 1 in which, when interactions are detected with the interface object while said active zones are deactivated, said active zones are redefined automatically and successively as a function of the first interactions to be successively detected, and the detected interactions are associated substantially simultaneously with the predetermined items of information.

14. A method according to claim 1, in which the measured physical magnitude is selected from a soundwave, a mechanical strain, a quantity of back-scattered light, and an electric field.

15. A man-machine interface device specially adapted to implement a method according to claim 1.

16. A method according to claim 3, in which, during a stage of redefining active zones subsequent to said initial sequence, a predetermined number K of active zones are defined in succession at the locations of the K first interactions to be detected after said initial predetermined sequence of interactions.

17. A method according to claim 4, in which, during a stage of redefining active zones subsequent to said initial sequence, a predetermined number K of active zones are defined in succession at the locations of the K first interactions to be detected after said initial predetermined sequence of interactions.

18. A method according to claim 16, in which the stage of redefining the active zones is interrupted if no following interaction is detected during a predetermined timeout after a detected interaction.

19. A method according to claim 17, in which the stage of redefining the active zones is interrupted if no following interaction is detected during a predetermined timeout after a detected interaction.

20. A method according to claim 6, in which during the stage of redefining active zones, an interaction is detected in an active zone when the measured physical magnitude is subject to a variation that is greater than a first predetermined limit, and after said stage of redefining active zones, an interaction is detected in an active zone when the measured physical magnitude is subject to a variation greater than a second predetermined limit that is itself less than the first limit.

* * * * *